United States Patent [19]

Anglaret et al.

[11] Patent Number: 4,485,994

[45] Date of Patent: Dec. 4, 1984

[54] DEVICE FOR SUPPORTING A PIPE

[75] Inventors: Gilbert Anglaret, Le Chesnay; René Wolff, Le Vesinet; Alain Audibert, Meudon, all of France

[73] Assignee: Framatome, Courbevoie, France

[21] Appl. No.: 216,702

[22] Filed: Dec. 15, 1980

Related U.S. Application Data

[63] Continuation of Ser. No. 209,924, Nov. 24, 1980, abandoned.

[30] Foreign Application Priority Data

Dec. 21, 1979 [FR] France ............... 79 31401

[51] Int. Cl.³ .............................................. F16L 3/08
[52] U.S. Cl. .................................... 248/65; 248/49; 248/DIG. 1
[58] Field of Search ............... 248/65, 49, 73, 55, 248/64, DIG. 1; 403/64, 65, 175; 285/61

[56] References Cited

U.S. PATENT DOCUMENTS

| | | | |
|---|---|---|---|
| 2,533,370 | 12/1950 | Haug | 248/55 |
| 3,286,280 | 11/1966 | Duggan | 248/49 |
| 3,746,371 | 7/1973 | Leopold et al. | 248/65 |
| 3,999,784 | 12/1976 | Kennedy | 248/65 |
| 4,252,466 | 2/1981 | Berti et al. | 248/49 |

FOREIGN PATENT DOCUMENTS 0031767 7/1981 European Pat. Off. ............. 248/65

Primary Examiner—William H. Schultz
Assistant Examiner—Ramon O. Ramirez
Attorney, Agent, or Firm—Pollock, Vande Sande & Priddy

[57] ABSTRACT

The present invention relates to a device which is able to hold a straight pipe element on a rigid structure.

The holding device according to the invention makes it possible to attach a pipe 1 to at least one anchoring point 3 which is fastened to a rigid structure 2 and it is characterized by the fact that it consists of a number of linear struts 4-5-6-7 which are attached by hinged joints 11-12-13-14, to the pipe 2 and connected to the anchoring point 3 and arranged in a number of planes perpendicular to the axis 16 of the pipe and each of which contain at least two of the said struts 4-5-6-7, whose longitudinal axes are arranged according to the sides of a triangle in such a manner as to take up the torques applied to the pipe.

The device is intended for a nuclear power station.

11 Claims, 7 Drawing Figures

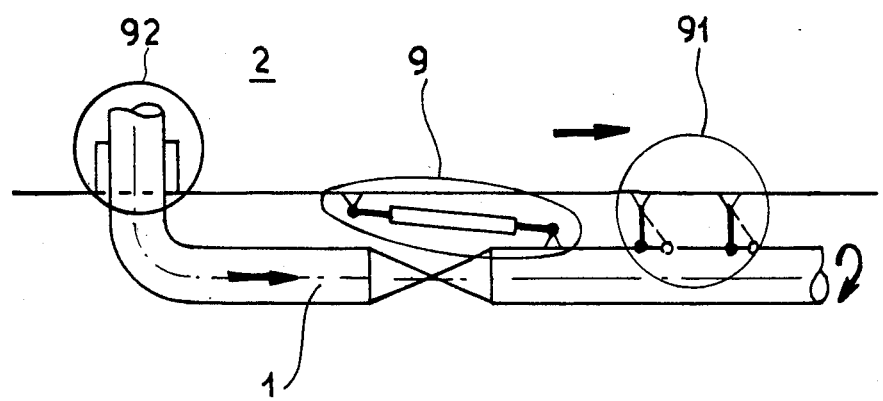

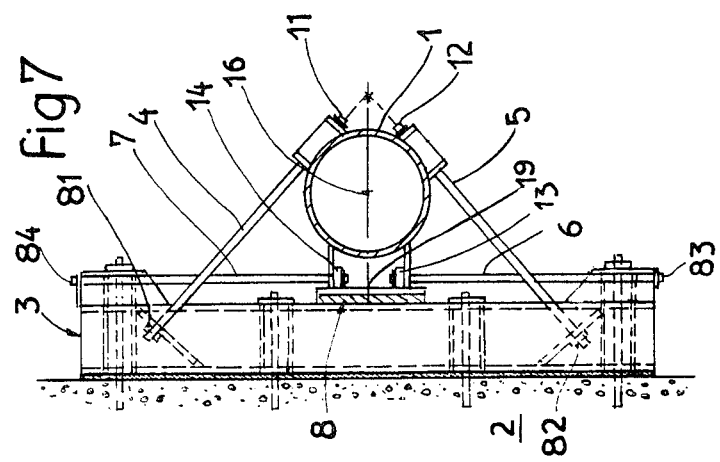
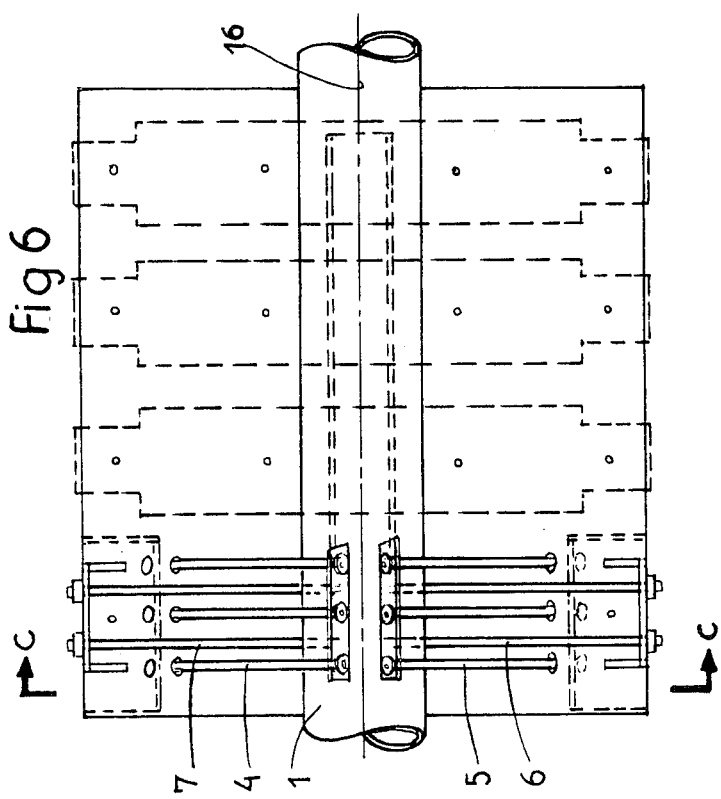

DEVICE FOR SUPPORTING A PIPE

This is a continuation of U.S. Pat. No. 209,924, filed Nov. 24, 1980 (now abandoned).

The present invention relates to a device which is able to hold a straight pipe element on a rigid structure, taking up the radial stresses applied to the pipe and permitting slight axial displacements due to expansion. It forms part of a combined system of supporting steam pipework radial outlets including also a fixed point for supporting the pipe. Such a system is used in a nuclear power station.

There are various types of devices for attaching a pipe to a rigid structure. In applicants' French Patent Application No. 77-31705, a straight pipe-work element is integral with square plates which are engaged between two slides which are integral with the fixed structure. Moreover, the pipe element is attached to the structure by two rods positioned at a distance from the slides and associated square plates. Each of the rods is hinged on the one hand to the pipe element and on the other hand to the structure. These rods make it possible to take up the stresses parallel to the faces of the slides. Whereas the radial support in all directions is assured by the slides and by the hinged rods, the arrangements of these elements along the pipework generates stresses at the level of the fixings of these elements offset from the fixed structure.

The object of the present invention is a device for supporting a pipe on a rigid structure, making it possible to take up the torsion or bending stresses of the pipe in all possible directions. The design of the device makes it possible to adapt it to greater or lesser stresses. The thermal bridge, between the pipe and the metal parts anchored to the support structure is reduced to a minimum, and the interruptions in the heat insulation on the pipe are limited. The device permits considerable temperature gradients owing to the absence of guiding by slides and makes it possible to keep the anchoring points, on the rigid structure, at an acceptable temperature level. The assembly is simple and the possibilities of adjustment are very wide. This device also makes slight axial displacements of the pipework possible, in relation to the fixed point situtated upstream.

The support device according to the invention makes it possible to attach a pipe to at least one anchoring point which is fastened to a rigid structure, and it includes a number of linear struts attached by hinges to the pipe which are connected to the anchoring flange and arranged in a number of planes perpendicular to the axis of the pipe, each of which planes contains at least two of the said struts of which the longitudinal axes are arranged according to the sides of a triangle, in such a manner as to take up the torques applied to the pipe.

The invention will now be described in more detail with reference to the attached drawings illustrating several embodiments of the invention by way of example.

FIG. 1 is an overall view of a combined support system including the device according to the invention.

FIG. 6 shows an elevation view of a still further embodiment of the device according to the invention.

FIG. 7 is a cross section along line C—C of FIG. 6.

Figure 3:
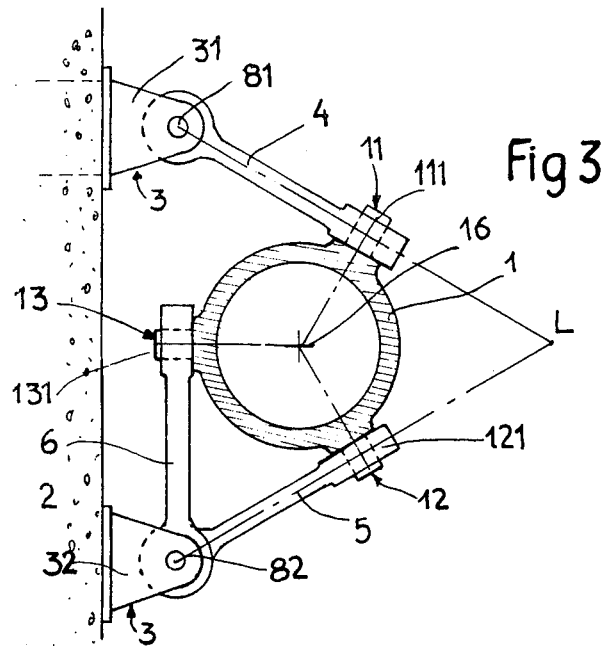
FIG. 3 shows a cross section through A—A of FIG. 2.

The device according to the invention is integrated into a combined supporting system shown in FIG. 1. The pipe 1 is held on a rigid structure 2 by the supporting device 91, and by a fixed point 92. A brace 9 is connected to the structure 2 and to the pipe.

This brace is an automatically locking brace which assures a flexible connection of limited resistance in the case of a slow variation (expansion, contraction), but makes locking possible in the case of a rapid variation (rupture of pipe, earthquake). This combined supporting system must make it possible to protect the section of pipe and especially the isolation valve placed on the latter.

The pipe is held on the rigid structure 2 by means of an anchoring point 3. This anchoring point consists of several separate elements (FIGS. 2-5) or is in one piece (FIGS. 6 and 7). It is anchored to the structure 2 by means of, for example, pre-stressed fastening braces.

The pipe 1 is connected to the anchoring point 3 by struts 4, 5, 6 (FIGS. 2 to 5) or 4, 5, 6, 7 (FIGS. 6 and 7). Each strut is linear in the manner of a brace or a rod. It is connected at its ends by two hinged joints through the pipe and on the other hand to the anchoring point, respectively. The struts 4 are connected by the hinged joints 11 to the pipe and by the hinged joints 81 to the anchoring point. The struts 5 are connected by the joints 12 to the pipe and by the hinged joints 82 to the anchoring point. The struts 6 are connected by the hinged joints 13 to the pipe and by the hinged joints 82 or 83 to the pipe. The struts 7 are connected by the hinged joints 14 to the pipe and by the hinged joints 84 to the anchoring point. The pipe is connected to the struts by at least three hinges 11 to 14 situated at 120° in relation to one another.

The longitudinal axes of the struts are arranged in a number of planes perpendicular to the axis 16 of the pipe. Each plane includes at least two struts. In the embodiment shown in FIGS. 2 and 3, the plane A—A includes three struts, 4, 5, 6.

The struts 4, 5, 6, 7 are each placed in a plane parallel to the axis of the pipe and are perpendicular to this axis.

The longitudinal axes of the struts of the said planes, perpendicular to the axis of the pipe, are arranged according to the sides of a triangle. In the embodiment of FIGS. 2 to 5, the three struts 4, 5, 6 of the same plane are hinged to the anchoring point by two hinges only, the struts 5 and 6 having a common hinge 82.

In the embodiments of FIGS. 2 to 5, the hinges 81 and 82 of the struts on the anchoring point are ball joints. These types of joints are necessary in order to make possible the expansion movements of the pipe according to the axis 16. Each strut 4 is hinged to a flange 31 by means of a joint axle 82 and a ball. Each strut 5 is hinged with a strut 6 to a double flange 32 by means of a joint axle 82 and a ball. The two components 5 and 6 are independent. The axles 81 and 82 of the joints are parallel to the axis of the pipe.

Figure 2:
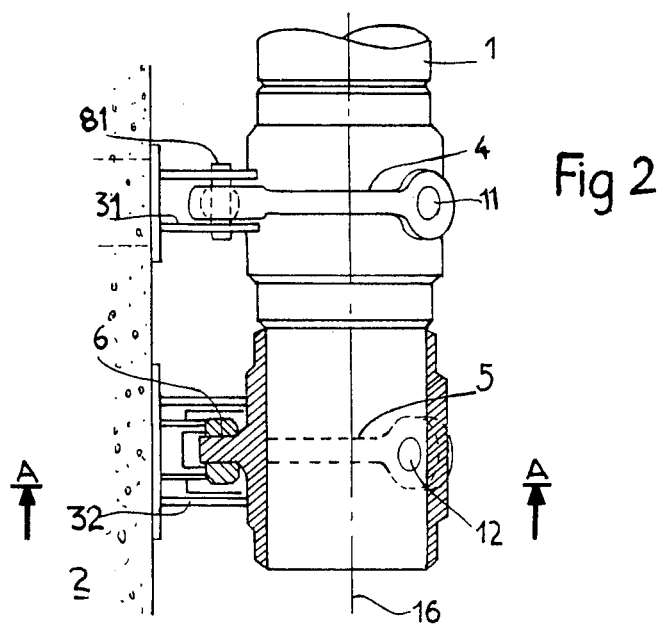
FIG. 2 is an elevation view of a first embodiment of the holding device, partly in section, along line D—D of FIG. 3.

In the embodiment of FIGS. 2 and 3, the hinges 11, 12, 13 are cylindrical joints. Each joint includes a radial pivot 111, 121, 131. Each pivot is integral with the pipe element and is engaged in a bore of the strut. The pivots of the same plane perpendicular to the axis of the pipe are situated 120° from one another. The hinged joints extend in the plane which contains the struts radially around 16.

Figure 5:
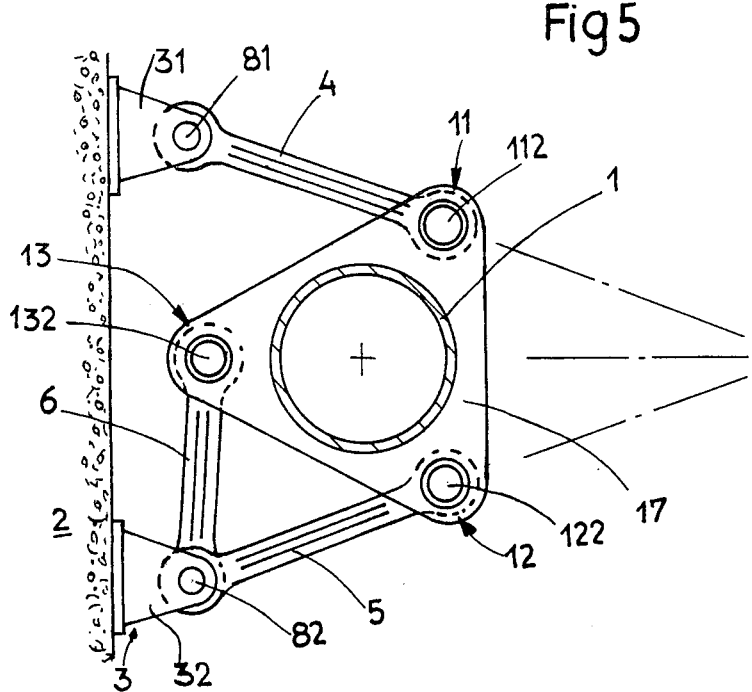
FIG. 5 shows a cross section along B—B of FIG. 4.
Figure 4:
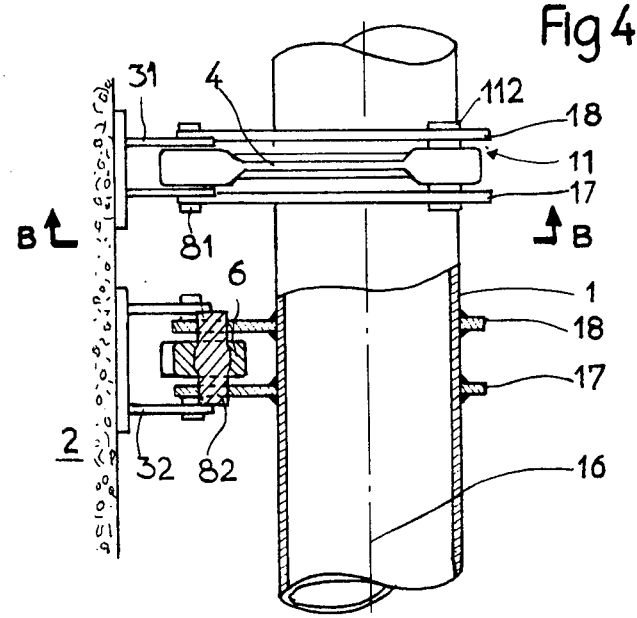
FIG. 4 is an elevation view of a second embodiment of the device, partly in section, along line E—E of FIG. 5.

In the embodiment of FIGS. 4 and 5, the joints 11, 12, 13 are ball joints. Each joint 11, 12, 13 consists of a axle 112, 122, 132, respectively, which is parallel to the pipe, and of a ball joint. These axles are held by two flanges 17 and 18 which are welded to the pipe.

The various hinges 81 of the struts 4 are aligned parallel to the axis of the pipe element. Similarly the different hinges 82 of the struts 5 and 6 are aligned parallel to the axis of the pipe. Each longitudinal axis of a strut passes through a pivot or a hinge on the pipe and through a hinge 81 or 82 on the anchoring point. The longitudinal axes of the struts are arranged according to the three sides of an imaginary triangle of which one of the apices is occupied by the hinge pin 82. The longitudinal axes of the struts of the same plane perpendicular to the axis of the pipe are convergent in pairs. The struts are preferably of equal length. The embodiment of FIGS. 6 and 7 includes struts 4, 5, 6, 7 which are bars or braces which only operate in tensile stress. The bars 4 and 5 are convergent and are situated in the same plane perpendicular to the axis of the pipe element, the bars 6 and 7 being slightly shifted in an adjacent plane. These bars 4, 5, 6, 7 are capable of bending to take up the axial expansion. A support stop 8 which is integral with support structure 2 is assembled on the anchoring point 3 of the side of the pipe element. A stop 19 which is integral with the pipe element is held against the sliding surface of the support stop 8 which makes a support of the pipe element possible. The support stop and the associated stop extend parallel to the axis of the pipe over a length corresponding to the length taken up by each group of bars. The support stop and the stop take up the stresses which are exerted perpendicularly to the pipe towards the structure.

In FIG. 7, the bars 4, 5, 6 and 7 are connected to the pipe by semi-hinges 11, 12, 13, 14 engaged in longitudinal bars which are integral with the pipe. They are connected to the anchoring point 3 by means of bolting. The bars can be connected by the hinges to a thick sleeve obtained by forging and forming a pipe element.

The bars 6 and 7 are aligned in pair in planes parallel to the pipe axis and are situated on the side of the stop and of the support stop. The bars 4 and 5 are included in two planes which intersect following a line situated beyond the pipe in relation to the support structure and are symmetrical in relation to the plane passing through the axis of the pipe and perpendicular to the rods 6 and 7. The rods 4 and 5 are assembled in such a manner that the hinges 11 and 12 of the pipe are relatively close and that the fastening point 81 and 82 on the anchoring point are relatively distant. The hinges 13 and 14 of the bars 6 and 7 are secured on a common stirrup, the bars 6 and 7 being assembled on either side of this common stirrup. The stirrup constitutes the stop.

The functioning of the device will now be described.

In the embodiment of FIGS. 2 to 5, the hinging of the struts on the anchoring points on the one hand and on the pipe element on the other hand makes axial expansion possible. Under the influence of a radial stress, equilibrium is achieved either by tensile stress or by compression of the struts, with a maximum value per strut which is equal to $\frac{2}{3}$ of the radial vector in the section. Under the influence of a torque, the three struts associated in a plane perpendicular to the axis of the pipe are stressed in tensile stress and compression. Under the influence of a bending moment and in no matter which direction, the struts are stressed by torques either in tensile stress, or compression, but always with a maximum value equal to $\frac{2}{3}$ of the vector of the section.

In the embodiments of FIGS. 6 and 7, all the struts or bars are operating in tensile stress and may bend. The sliding support stop associated with the stop takes up the normal radial stresses on the sliding surface which is parallel to the wall of the rigid structure. The flexibility of the bars, which may be improved by semi-hinges, permits slight axial displacements due to expansion. The pipe is guided by support against the support stop 8. The whole of the bars achieves a perfect axial guiding with a friction effect against the support stop 8. This friction is reduced by the addition of a suitable sliding material. Under the influence of a radial stress, the bars 4, 5, 6, 7 are put in tensile stress and the support stop 8 withstands a compression stress. Under the influence of a torque which tends to cause the rotation of the pipe in a clockwise direction, the bars 4 and 5 are subjected to tensile stress in such a manner as to oppose rotation. Under the influence of a torque which tends to cause a rotation in the opposite direction, the bars 5 and 7 are put under tensile stress. Under the influence of a bending moment which tends to detach the end of the pipe element in relation to the rigid structure 2, the equilibrium is achieved by tensile stress in the bars adjacent to the points of application of the moment and by compression on the part of the support stop 8 which is situated on the opposite side. If the moment tends to bring the pipe closer to the rigid structure, the effects are reversed. Under the influence of a moment which tends to displace the end of the pipe element 1, parallel to the wall of the support structure, equilibrium is achieved by the bars situated on the side opposite to the displacement. The bars situated at the center of the unit are hence hardly stressed at all.

It is understood that variations and improvements to details can be imagined without going outside the framework of the invention and similarly the use of equivalent means can be contemplated. For example, the bars 4, 5, 6 shown in FIGS. 2 and 3 may be fixed to the pipe by a thick sleeve obtained by forging.

What is claimed is:

1. A device for supporting a piece of pipework (1) with at least one anchoring plate (3) sealed to a rigid structure (2), comprising rectilinear coupling elements (4, 5, 6) which are connected to the anchoring plate (3) and are attached to the pipework by joints (11, 12, 13) so that their longitudinal axes are at right angles to the axis of said pipework, said coupling elements (4, 5, 6) having their longitudinal axes arranged in a triangular configuration so as to absorb torsion or bending stresses to which said pipework (1) is subjected.

2. A device according to claim 1, wherein said coupling elements (4, 5, 6) are arranged in a plurality of planes perpendicular to said pipework axis, each plane containing at least three said coupling elements.

3. A device according to claims 1 or 2 wherein the joints (11, 12, 13) of said elements on said pipework being placed at 120° relative to each other.

4. A device according to claim 3, wherein said joints (11, 12, 13) of said coupling elements (4, 5, 6) on said pipework are cylindrical articulations extending in the plane (A—A) containing said elements, radially around said pipework axis (16).

5. A device according to claim 3 wherein the coupling elements comprise axles (112, 122, 132) for coupling said pipework (1) said axles being parallel to said pipework axis (16).

6. A device according to claim 5, wherein said axles (112, 122, 132) are integrally joined to each other and to said pipework (1) by two flanges (17-18) welded to the latter.

7. A device according to claim 1 or 2, wherein said coupling elements (4, 5, 6) are jointed to said anchoring plate (3) by joints (81, 82, 83, 84), two of said coupling elements, contained in one and the same plane at right angles to said pipework axis (16), being connected to said anchoring plate (3) by a common articulation axle (82).

8. A device according to claim 1, comprising a bearing pad (8) integrally fixed to said rigid structure (2) and in contact through a sliding surface with a buffer (19) integrally fixed to said pipework (1), and at least four coupling elements (4, 5, 6, 7) arranged in pairs in planes which are perpendicular to said pipework axis (16), two of said elements (6, 7) being placed on either side of said buffer.

9. A device according to claim 2 or 8, wherein said coupling elements (4 or 5 or 6 or 7) are contained in planes which are parallel to said pipework axis (16) and intersect along a line (L) located beyond said pipework relative to said rigid structure.

10. A device according to claim 1, wherein said coupling elements (4, 5, 6) are of equal length.

11. A device according to claim 1, wherein at least one of the joints (11, 21, 31, 81, 82) connecting each coupling element to said piping and to said anchoring plate (3) is a ball joint.

* * * * *